United States Patent
Frett

(10) Patent No.: US 8,356,963 B2
(45) Date of Patent: Jan. 22, 2013

(54) CHANNEL AND ANCHOR ASSEMBLY FOR SECURING CARGO

(75) Inventor: John Frett, Crete, IL (US)

(73) Assignee: TTX Company, Chicago, IL (US)

( * ) Notice: Subject to any disclaimer, the term of this patent is extended or adjusted under 35 U.S.C. 154(b) by 0 days.

(21) Appl. No.: 12/963,327

(22) Filed: Dec. 8, 2010

(65) Prior Publication Data

US 2012/0148364 A1    Jun. 14, 2012

(51) Int. Cl.
*B60P 7/08* (2006.01)
*B61D 5/00* (2006.01)
*B65D 63/00* (2006.01)

(52) U.S. Cl. ............ 410/97; 410/104; 410/105

(58) Field of Classification Search ........ 410/97, 410/101, 106, 110, 116, 96, 117, 118, 129, 410/112, 113, 114; 105/355; 248/499
See application file for complete search history.

(56) References Cited

U.S. PATENT DOCUMENTS

| | | | | |
|---|---|---|---|---|
| 3,282,229 A * | 11/1966 | Elsner | ............ | 410/105 |
| 4,412,472 A * | 11/1983 | Welch | ............ | 84/318 |
| 5,131,606 A * | 7/1992 | Nordstrom | ............ | 244/118.1 |
| 5,139,375 A * | 8/1992 | Franchuk | ............ | 410/105 |
| 5,765,978 A * | 6/1998 | Looker et al. | ............ | 410/105 |
| 6,626,623 B2 * | 9/2003 | DeLay | ............ | 410/116 |
| 6,644,901 B2 * | 11/2003 | Breckel | ............ | 410/104 |
| 7,517,181 B2 * | 4/2009 | Dunaway et al. | ............ | 410/105 |
| 2008/0196939 A1 * | 8/2008 | Lubenow et al. | ............ | 174/652 |

OTHER PUBLICATIONS

Portec Rail Products, Inc. Catalog, last downloaded from http://www.portecrail.com/pdf/Catalogs/SSD%20Product%20Catalog.pdf on Apr. 6, 2012.

* cited by examiner

*Primary Examiner* — Glenn Dayoan
*Assistant Examiner* — Sunsurraye Westbrook
(74) *Attorney, Agent, or Firm* — Brinks Hofer Gilson & Lione

(57) ABSTRACT

A channel and anchor assembly includes a channel and an anchor. The channel has a generally c-shaped cross-section that includes first and second upper extensions that define a plurality of openings, first and second side edges connected at first ends to the first and second upper extensions, respectively, and a lower cross member that extends between second ends of the first and the second side edges. The first and the second upper extensions lie in substantially a first plane, and the lower cross member lies in substantially a second plane that is separated from the first plane by a distance sized to allow an anchor member to be inserted into the channel. The openings are sized and positioned to receive complementary protrusions extending from the anchor member. The anchor includes a substantially rectangular lower planar member configured to enter the channel. A plurality of protrusions extend from a top surface of the lower planar member. The protrusions are positioned adjacent to first and second edges of the lower planar member and are configured to enter the plurality of openings defined by the channel.

20 Claims, 5 Drawing Sheets

CHANNEL AND ANCHOR ASSEMBLY FOR SECURING CARGO

BACKGROUND

Freight cars may include anchoring assemblies that enable cargo to be secured to the freight car bed via straps, such as a chain and winch assembly. In some instances, the assemblies include channels and anchor members. The channels may have a c-shaped cross-section and the anchors may be configured to slide into the channels. The channels may extend along respective edges of the freight car. The anchor may be configured to attach to the straps.

Advances in the development of straps have yielded straps capable of increased tensioning capability. However, the holding capacity of channels, which is largely a function of the gauge or thickness of the channel material and the geometry of the channel, has not kept pace.

BRIEF SUMMARY

An object of the present invention is to provide an improved channel and anchor assembly for securing freight. The channel has a generally c-shaped cross-section that includes first and second upper extensions that define a plurality of openings with closed perimeters. First and second side edges are connected at first ends to the first and second upper extensions, respectively, and a lower cross member extends between second ends of the first and the second side edges. The first and the second upper extensions lie in substantially a first plane, and the lower cross member lies in substantially a second plane that is separated from the first plane by a distance sized to allow an anchor to be inserted into the channel. The openings are sized and positioned to receive complementary freestanding protrusions extending from the anchor member.

The anchor includes a substantially rectangular lower planar member configured to enter the channel. A plurality of freestanding protrusions extend from a top surface of the lower planar member. The protrusions are positioned adjacent to first and second edges of the lower planar member and are configured to enter the plurality of openings defined by the channel.

Other features and advantages will be, or will become, apparent to one skilled in the art upon examination of the following figures and detailed description. It is intended that all such additional features and advantages included within this description be within the scope of the claims, and be protected by the following claims.

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims.

DETAILED DESCRIPTION OF THE DRAWINGS

The exemplary embodiments below describe a channel and anchor assembly for securing cargo to, for example, a freight car with a flat bed, a flat bed truck, or the like. The channel includes openings along first and second upper extensions configured to receive protrusions extending from an upper surface of the anchor. Generally, the protrusions and openings cooperate to limit deformation of the first and second upper extensions of the channel when tension is applied to the anchor by, for example, a chain and winch assembly or other type of strap tensioning device.

Figure 1:
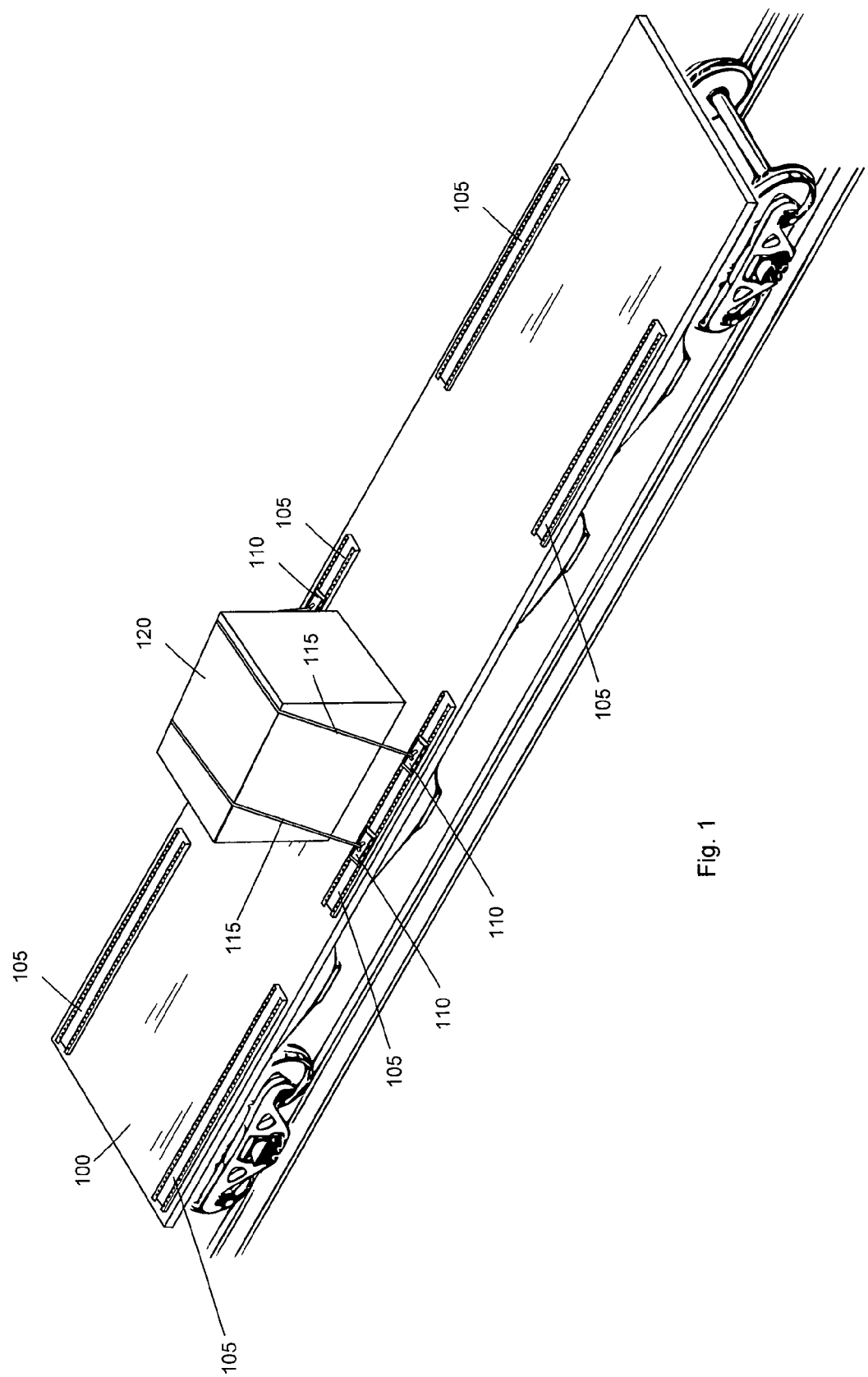
FIG. 1 illustrates a perspective view of a freight car with an anchor and channel assembly for securing freight.

FIG. 1 illustrates a perspective view of a freight car 100. Attached to the freight car 100 are a group of channels 105 positioned in parallel pairs on opposite sides of the deck of the freight car 100. The channels 105 may be attached to the deck via techniques known in the art, such as welding, bolting, etc. Positioned within two center channels 105 are a pair of respective anchors 110. The anchors 110 are slid into the channels 105 from an open end which may later be closed and then positioned alongside cargo to be secured. Straps 115, such as chain and winch assemblies, are coupled to the anchors 110 to secure cargo 120 to the freight car. The winch enables production of tension on the chain capable of securing the cargo 120.

Figure 2:
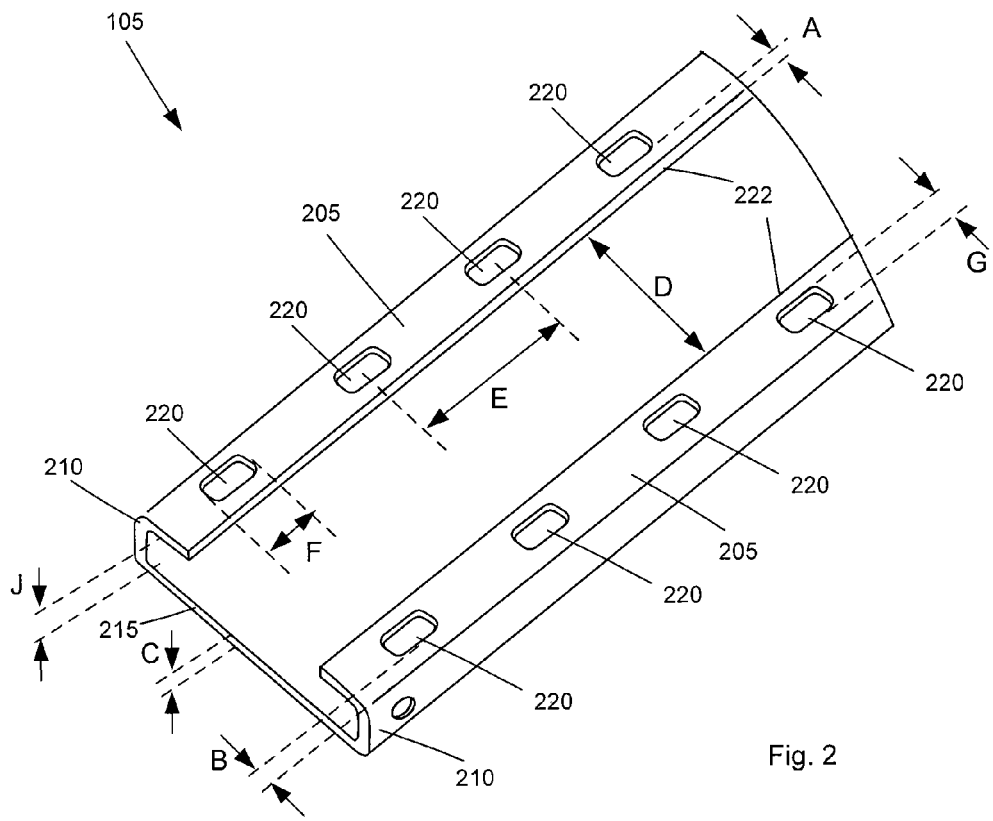
FIG. 2 illustrates a perspective view of a channel.

FIG. 2 illustrates a perspective view of a channel 105. The channel 105 includes first and second upper extensions 205, first and second side edges 210, and a lower cross member 215. The first and second side edges 210 are connected to respective top edges of the first and second upper extensions 205, and the lower cross member 215 extends between respective bottom edges of the first and the second side edges 210 to define a generally c-shaped cross-section. The channel 105 may be fabricated from a material suitably strong enough to secure cargo, such as steel or other rigid material. The thickness C of the material may be sized to enable the channel to withstand tensions greater than 20,000 lbs. For example, the thickness C may be about ¼ inches.

The first and the second upper extensions 205 generally lie in a first plane that is separated by a distance J from a second plane defined by the lower cross member 215 and are generally parallel to the lower cross member 215. The distance J may be sized to allow an anchor 110 to be inserted within the channel 105. In some implementations, the distance J may be about 1 9/16 to 4 1/8 inches.

Inside edges 222 of the first and second upper extensions 205 may be separated by a distance D that may be about 3 3/16 inches. In some implementations, distance D may be sized to slightly larger than the width D' of a top planar member 310 (FIG. 3) of the anchor 110.

The first and second upper extensions 205 define a plurality of openings 220. The openings 220 are sized and positioned to receive complementary freestanding protrusions extending from the anchor 110. The length F and width G of each opening 220 may be about 1" and ½", respectively. The openings 220 each have a closed perimeter. For example, the openings 220 may be recessed from respective inside edges 222 of the first and second upper extensions 205 by a distance A, which may be about ⅜", The openings 220 may be recessed from the top edges of the first and second sides 210 by a distance B, which may be about 9/16". The openings 220 may be separated by a distance E of about 3 inches when measure from centerlines of the openings 220. The size and positioning of the openings 220 may be configured to match corresponding protrusions 305 (FIG. 3) extending from the anchor 110.

Figure 3:
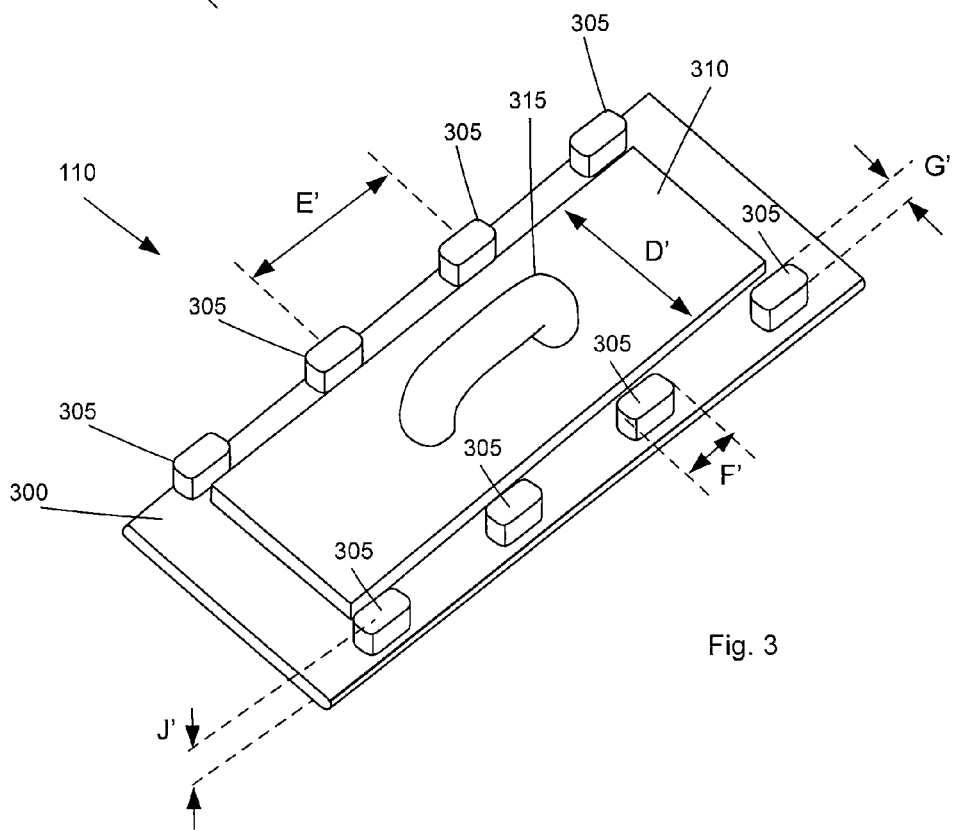
FIG. 3 illustrates a perspective view of an anchor.

FIG. 3 illustrates a perspective view of an anchor 110 that may be utilized in combination with the channel 105 described above. The anchor 110 includes a lower planar member 300, an upper planar member 310, a group of protrusions 305, and a handle 315. The lower planar member 300 may define a rectangular shape sized to enter the channel 105 described above.

The protrusions 305 extend from a top surface of the lower planar member 300 in a region substantially adjacent to first and second edges of the lower planar member 300. The protrusions 305 are freestanding, which is to say that the top surface and side surface(s) of the respective protrusions may not be in contact with any other part of the anchor 110 so that the protrusions 305 may enter the closed perimeter openings 220 described above. The length F' of each of the protrusions may be generally the same as the length F of the openings 220, albeit slightly smaller to allow the protrusions to enter the openings 220. For example, the length F' may be about 1". Likewise, the width G' may be slightly smaller than the width G of each of the openings 220. For example, the width G' may be about ½". The height of each protrusion may be slightly smaller than the distance J. The distance E' between each of the protrusions 305 may be configured to generally match the distance E between each of the openings 220. For example, the distance E' may be about 3 inches when measure from centerlines of the protrusions 305.

The upper planar member 310 may be positioned on the top surface of the lower planar member 300 and between the protrusions 305. The width D' of the upper planar member 310 may be sized to match the distance D between the inside edges of the first and second upper extensions 205 to enable the upper planar member 310 to fit snuggly between the first and second upper extensions 205. For example, the distance D' may be about 3 and 3/16 inches.

The handle 315 is attached to the top surface of the upper planar member 310. The handle 315 is configured to attach to a strap, such as a chain and winch, assembly for securing cargo. In some implementations, the anchor 110 may not include the upper planar member 310, in which case the handle is attached to a top surface of the lower planar member 300.

The lower planar member 300, protrusions 305, upper planar member 310, and the handle 315 may be formed in a single casting process or separate process, then secured together through a method known in the art, such as welding. Alternatively, each item or certain items may be formed separately and attached via other means, such as by welding, or through the use of fasteners (e.g., screws, rivets).

Figure 4:
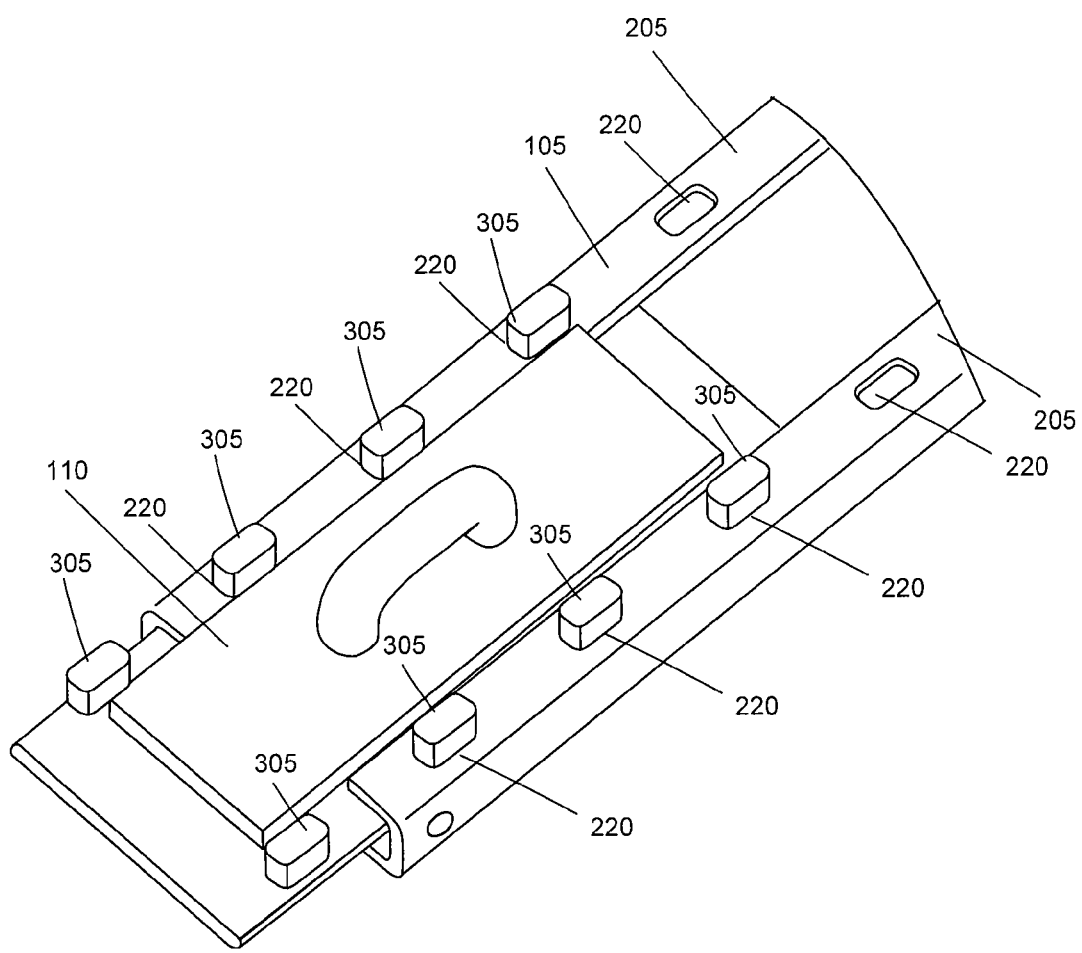
FIG. 4 illustrates a perspective view of a channel and anchor assembly.

In operation, an operator slides the anchor 110 into the channel 105 until a desired location along the channel 105 is reached. The operator then attaches a strap that attaches cargo to the handle 315 of the anchor 110 and then tensions the strap. As the strap is brought into tension, the anchor 110 will rise within the channel 105 until the protrusions 305 of the anchor 110 fully extend through the openings 220 of the channel 105, as illustrated in FIG. 4. Alternatively, the anchor can be raised and secured by other means. Tensioning of the strap may continue until the desired tension is reached. The protrusions 305 on the anchor 110 and the openings 220 in the channel cooperate to limit deformation of the first and second upper extensions 205. In other words, the first and second upper extensions 205 are substantially prevented from bending into an open position that would otherwise enable the anchor 110 to be pulled out of the channel 105 when the straps are under tension. The engagement of the protrusions 305 with the openings 220 enables greater amounts of strapping tension, which in turn enables securing heavier loads.

Figure 5A:
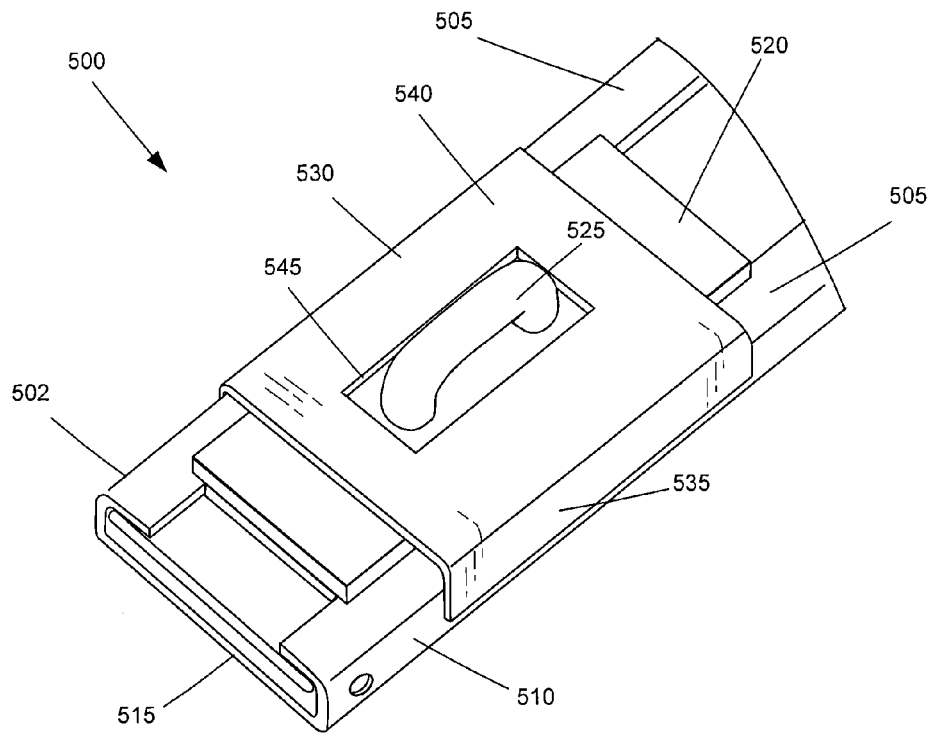
FIGS. 5A, 5B are perspective and cross-section views, respectively, of a second embodiment of a channel and anchor assembly for securing cargo
Figure 5B:
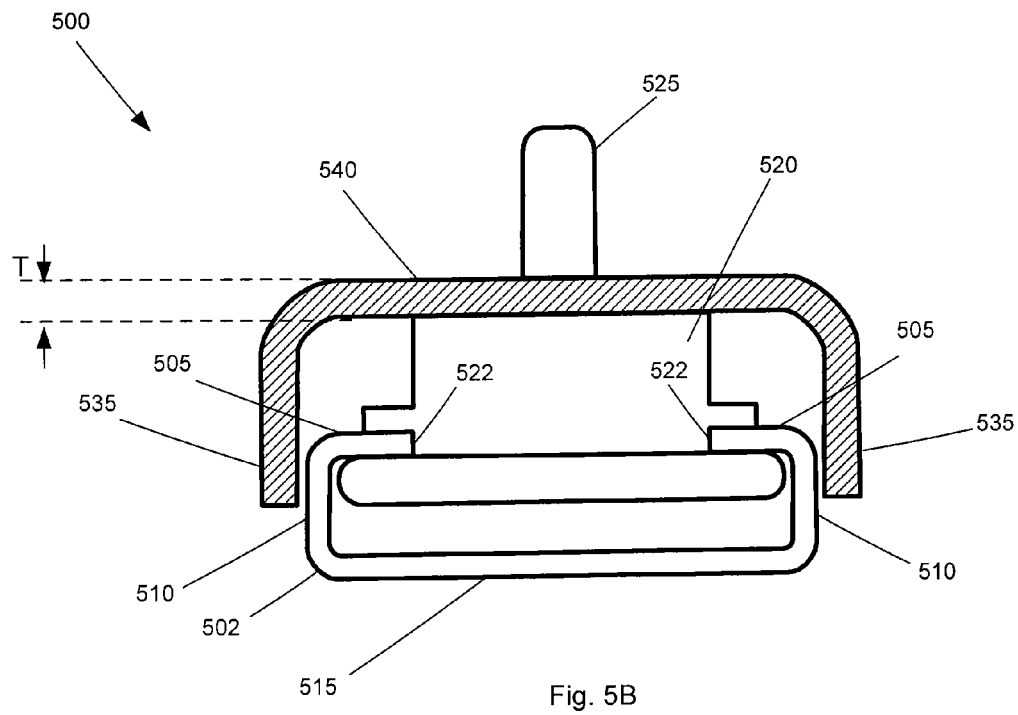

FIGS. 5A and 5B are perspective and cross-section views, respectively, of a second embodiment of a channel and anchor assembly 500 for securing cargo. The assembly 500 includes a channel 502, an anchor 520, and a cover member 530. The channel 502 defines a generally c-shaped cross-section. The channel 502 includes first and second upper extensions 505, first and second side edges 510 connected at first ends to the first and second upper extensions 505, respectively, and a lower cross member 515 that extends between second ends of the first and the second side edges 510. The first and second upper extensions 505, first and second side edges 510, and lower cross member 515 may be configured as described above with reference to FIG. 2. The openings described above may or may not be included.

The anchor 520 includes a handle 525. The anchor 520 is configured to be inserted into the channel 502. In some implementations, the anchor may define first and second grooves 522 configured to ride along inside edges of the first and second upper extension 505 as the anchor 520 is inserted into the channel 502. In other implementations, grooves may not be defined, The cover member 530 has a generally u-shaped cross-section and includes first and second side edges 535, and a cross member 540 that extends between the first and second side edges 535. The first and second side edges 535 of the cover member 530 are positioned adjacent to the first and second side edges 510 of the channel 502. The cover member 530 increases the holding strength of the anchor by reinforcing the first and second side edges 510 of the channel 502 so as to substantially limit deformation of the first and second side edges of the channel when a load is applied to the anchor. The thickness T of the cover member may be sized to enable increased holding strength of the assembly 500. For example, the thickness T may be about 3/8". The cover member 530 and anchor 520 may be formed in a single casting process or separate process, then secured together through a method known in the art such as by welding or through the use of fasteners. In some implementations, the cross member 540 is placed over the anchor at a later time. The cross member 540 may define an opening 545 sized to allow the handle 525 to pass through the opening 545.

Figure 6:
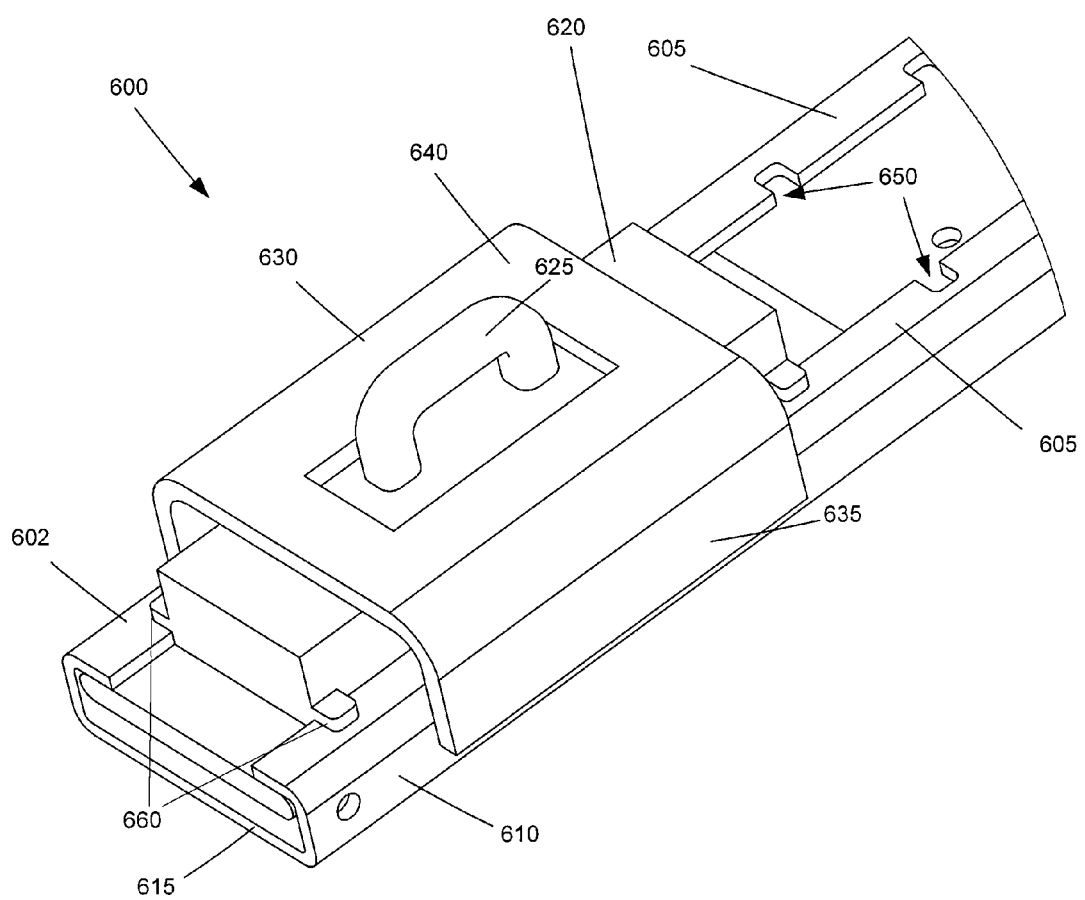
FIG. 6 is a perspective view of a third embodiment of a channel and anchor assembly for securing cargo.

FIG. 6 is a perspective view of yet another alternative embodiment of a channel and anchor assembly 600 for securing cargo. The assembly 600 includes a channel 602, an anchor 620, and a cover member 630. The channel 602 defines a generally c-shaped cross-section. The channel 602 includes first and second upper extensions 605, first and second side edges 610 connected at first ends to the first and second upper extensions 605, respectively, and a lower cross member 615 that extends between second ends of the first and the second side edges 610. The first and second upper extensions 605, first and second side edges 610, and lower cross member 615 may be configured as described above with reference to FIG. 2. A group of generally u-shaped notches 650 are defined on the first and second upper extensions 605. The notches 650 are configured to receive corresponding guide-members 660 defined by the anchor 620.

The anchor 620 includes a handle 625. The anchor 620 is configured to be inserted into the channel 602. In some implementations, the anchor 620 may define guide-members 660 configured to be inserted within the notches 650 of the channel 602. The height of respective guide-members 660 is sized to allow the anchor 620 to slide within the channel 602 to a desired location within the channel 602. In other words, the height measured from the lower surface of the anchor 620 to the top surface of a given guide-member 660 is lower than dimension J described above. Once a desired location is reached, the anchor 620 is pulled upward within the channel 602 so that the guide-members 660 are inserted into the notches 650.

The cover member 630 may generally include the features described above. The height of the side edges 635 may be sized such that when the anchor 620 is in the upward position described above the edges 635 extend past the upper extensions 605 of the channel 602 and overlap the side edges 610 of the channel 602. As described above, the cover member 630 increases the holding strength of the anchor 620 by reinforcing the first and second side edges 610 of the channel 602 so as to substantially limit deformation of the first and second side edges 610 of the channel 602 when a load is applied to the anchor 620. The cover member 630 and anchor 620 may be formed in a single casting process or separate process, then secured together through a method known in the art such as by welding or through the use of fasteners.

While various embodiments of the embodiments have been described, it will be apparent to those of ordinary skill in the art that many more embodiments and implementations are possible that are within the scope of the claims. The various dimensions described above are merely exemplary and may be changed as necessary. For example, the various dimensions may be adjusted to allow for clearance between components that engage one another. Accordingly, it will be apparent to those of ordinary skill in the art that many more embodiments and implementations are possible that are within the scope of the claims. Therefore, the embodiments described are only provided to aid in understanding the claims and do not limit the scope of the claims.

I claim:

1. A channel comprising:
   first and second upper extensions, each extension including a first and a second substantially straight edge that extend in a longitudinal direction of the channel, and at least one opening with a closed perimeter defined between the first and the second edges;
   first and second side edges connected at first ends to said first edges of said first and second upper extensions, respectively; and
   a lower cross member that extends between second ends of said first and said second side edges,
   wherein said first and said second upper extensions lie in substantially a first plane, and said lower cross member lies in substantially a second plane that is separated from said first plane by a distance sized to allow an anchor member to be inserted into said channel between said second edges of said upper extensions, and wherein said openings are sized and positioned to receive complementary protrusions extending from said anchor member.

2. The channel according to claim 1, wherein said first and second upper extensions are separated by a distance substantially equal to a top planar member of said anchor.

3. The channel according to claim 1, wherein a width of each opening is about ½".

4. The channel according to claim 1, wherein said openings are recessed from respective edges of said first and second upper extensions by about ⅜".

5. The channel according to claim 1, wherein said openings are separated by a distance of about 3 inches when measured from respective centers of said openings.

6. The channel according to claim 1, wherein a cross-section of the channel is generally c-shaped and the channel is attached to a rail car.

7. An anchor for securing freight, the anchor comprising:
   a substantially rectangular lower planar member configured to enter a channel; and
   a plurality of freestanding protrusions extending from each side of said lower planar member, from a top surface of said lower planar member in a region adjacent to first and second edges of said lower planar member, wherein the plurality of free standing protrusions are configured to enter a plurality of openings defined by said channel.

8. The anchor according to claim 7, further comprising an upper planar member positioned on said top surface of said lower planar member, sized to fit between said plurality of protrusions, wherein a width of said lower planar member is sized to substantially match a channel opening width of said channel.

9. The anchor according to claim 8, further comprising a handle connected to a top surface of said upper planar member configured to attach to a strap for securing cargo.

10. The anchor according to claim 7, wherein a width of each protrusion of said plurality of protrusions is about ½".

11. The anchor according to claim 7, wherein each protrusion of said plurality of protrusions is separated from an adjacent protrusion by a distance of about 3 inches when measured from respective centers of said plurality of protrusions.

12. An apparatus for securing freight comprising:
   a channel that includes:
      first and second horizontally arranged upper extensions;
      first and second vertically arranged side edges connected at first ends to said first and second upper extensions, respectively; and
      a horizontally arranged lower cross member that extends between second ends of said first and said second side edges;
   an anchor configured to be inserted into said channel, wherein said anchor includes a handle; and
   a cover member having a generally u-shaped cross-section that includes first and second vertically arranged side edges, and a horizontally arranged cross member that extends between said first and second side edges that includes at least one opening defined thereon, wherein said cross member is configured to be placed over said anchor such that inner surfaces of said first and second vertically arranged side edges of said cover are positioned adjacent to outside surfaces of said first and second vertically arranged side edges of said channel to substantially limit deformation of said first and second side edges of said channel when a load is applied to said anchor.

13. An assembly for securing freight comprising:
   a channel comprising:
      first and second upper extensions, each extension including at least one opening with a closed perimeter defined thereon defined thereon;
      first and second side edges connected at first ends to said first and second upper extensions, respectively; and
      a lower cross member that extends between second ends of said first and said second side edges, wherein said first and said second upper extensions lie in substantially a first plane, and said lower cross member lies in substantially a second plane that is separated from said first plane by a distance sized to allow an anchor member to be inserted into said channel, and wherein said openings are sized and positioned to receive complementary protrusions extending from said anchor member; and an anchor comprising:

a substantially rectangular lower planar member configured to enter said channel; and a plurality of protrusions extending from each side of said lower planar member, from a top surface of said lower planar member in a region positioned adjacent to first and second edges of said lower planar member, wherein the plurality of free standing protrusions are configured to enter said plurality of openings defined by said channel.

14. The assembly according to claim 13, wherein a width of each opening is about ½".

15. The assembly according to claim 13, wherein said openings are recessed from respective edges of said first and second upper extensions by about ⅜".

16. The assembly according to claim 13, wherein said openings are separated by a distance of about 3 inches when measured from respective centers of said openings.

17. The assembly according to claim 13, wherein said channel comprises steel, and a thickness of said steel is about ¼ inches.

18. The assembly according to claim 13, wherein said anchor further comprises an upper planer member positioned on said top surface of said lower planar member, sized to fit between said plurality of protrusions, wherein a width of said lower planar member is sized to match a channel opening width of said channel.

19. The assembly according to claim 18, further comprising a handle connected to a top surface of said upper planar member configured to attach to said chain and winch assembly.

20. The assembly according to claim 18, wherein said first and second upper extensions are separated by a distance substantially equal to a width of said upper planar member of said anchor.

\* \* \* \* \*